United States Patent
Lin et al.

(10) Patent No.: US 11,809,822 B2
(45) Date of Patent: Nov. 7, 2023

(54) JOINT VISUAL-SEMANTIC EMBEDDING AND GROUNDING VIA MULTI-TASK TRAINING FOR IMAGE SEARCHING

(71) Applicant: Adobe Inc., San Jose, CA (US)

(72) Inventors: Zhe Lin, Fremont, CA (US); Xihui Liu, Hong Kong (HK); Quan Tran, San Jose, CA (US); Jianming Zhang, Campbell, CA (US); Handong Zhao, San Jose, CA (US)

(73) Assignee: Adobe Inc., San Jose, CA (US)

( * ) Notice: Subject to any disclaimer, the term of this patent is extended or adjusted under 35 U.S.C. 154(b) by 610 days.

(21) Appl. No.: 16/803,480

(22) Filed: Feb. 27, 2020

(65) Prior Publication Data

US 2021/0271707 A1 Sep. 2, 2021

(51) Int. Cl.
  *G06F 16/538* (2019.01)
  *G06F 40/216* (2020.01)
  (Continued)

(52) U.S. Cl.
  CPC ...... *G06F 40/216* (2020.01); *G06F 16/24578* (2019.01); *G06F 16/538* (2019.01);
  (Continued)

(58) Field of Classification Search
  CPC .............. G06F 16/5854; G06F 16/538; G06F 16/24578; G06F 16/56; G06F 40/30;
  (Continued)

(56) References Cited

U.S. PATENT DOCUMENTS

2017/0098153 A1* 4/2017 Mao .................. G06N 3/045
2018/0373955 A1* 12/2018 Soldevila .............. G06F 18/214
(Continued)

FOREIGN PATENT DOCUMENTS

WO WO-2021076381 A1 * 4/2021

OTHER PUBLICATIONS

Yeh et al., "Unsupervised Textual Grounding: Linking Words to Image Concepts", Jun. 2018, 2018 IEEE/CVF Conference on Computer Vision and Pattern Recognition (Year: 2018).*
(Continued)

*Primary Examiner* — Hosain T Alam
*Assistant Examiner* — Robert F May
(74) *Attorney, Agent, or Firm* — Kilpatrick Townsend & Stockton LLP

(57) ABSTRACT

Certain embodiments involve a method for generating a search result. The method includes processing devices performing operations including receiving a query having a text input by a joint embedding model trained to generate an image result. Training the joint embedding model includes accessing a set of images and textual information. Training further includes encoding the images into image feature vectors based on spatial features. Further, training includes encoding the textual information into textual feature vectors based on semantic information. Training further includes generating a set of image-text pairs based on matches between image feature vectors and textual feature vectors. Further, training includes generating a visual grounding dataset based on spatial information. Training further includes generating a set of visual-semantic joint embeddings by grounding the image-text pairs with the visual grounding dataset. Additionally, operations include generating an image result for display by the joint embedding model based on the text input.

20 Claims, 8 Drawing Sheets

(51) Int. Cl.
| | |
|---|---|
| *G06F 16/583* | (2019.01) |
| *G06N 3/08* | (2023.01) |
| *G06F 40/30* | (2020.01) |
| *G06F 16/56* | (2019.01) |
| *G06F 16/2457* | (2019.01) |
| *G06V 30/262* | (2022.01) |
| *G06F 18/22* | (2023.01) |
| *G06F 18/213* | (2023.01) |
| *G06F 18/214* | (2023.01) |
| *G06V 30/19* | (2022.01) |
| *G06V 10/75* | (2022.01) |

(52) U.S. Cl.
CPC .......... *G06F 16/56* (2019.01); *G06F 16/5854* (2019.01); *G06F 18/213* (2023.01); *G06F 18/214* (2023.01); *G06F 18/22* (2023.01); *G06F 40/30* (2020.01); *G06N 3/08* (2013.01); *G06V 10/75* (2022.01); *G06V 30/19147* (2022.01); *G06V 30/274* (2022.01)

(58) Field of Classification Search
CPC .. G06V 30/274; G06K 9/6201; G06K 9/6232; G06K 9/6256; G06N 3/08
USPC .......................................................... 707/730
See application file for complete search history.

(56) References Cited

U.S. PATENT DOCUMENTS

| | | | | |
|---|---|---|---|---|
| 2020/0175046 | A1* | 6/2020 | Wang | ................. G06N 7/01 |
| 2021/0056742 | A1* | 2/2021 | Sikka | ................. G06F 16/51 |
| 2021/0081728 | A1* | 3/2021 | Lai | ................. G06N 3/045 |
| 2022/0138252 | A1* | 5/2022 | Hsiao | ................. G06F 16/5846 |
| | | | | 707/722 |

OTHER PUBLICATIONS

Frome, Andrea, et al, "Devise: A Deep Visual-Semantic Embedding Model." Advances in neural information processing systems, 2013, 9 pages.

Faghri, Fartash, et al., "Vse++: Improved Visual-Semantic Embeddings." arXiv preprint arXiv: 1707.05612,v4, Jul. 2017, 14 pages.

Lee, Kuang-Huei, et al., "Stacked Cross Attention For Image-Text Matching", Proceedings of the European Conference on Computer Vision (ECCV), 2018, 16 pages.

Wu, Hao, et al., "Unified Visual-Semantic Embeddings: Bridging Vision and Language with Structured Meaning Representations", 2019 IEEE/CVF Conference on Computer Vision and Pattern Recognition (CVPR), 2019, 10 pages.

Fukui, Akira, et al., "Multimodal Compact Bilinear Pooling For Visual Question Answering And Visual Grounding." arXiv preprint arXiv:1606.01847, 2016, 12 pages.

Xiao, Fanyi, et al., "Weakly-Supervised Visual Grounding of Phrases with Linguistic Structures", Proceedings of the IEEE Conference on Computer Vision and Pattern Recognition, 2017 10 pages.

Yu, Licheng, et al., "Mattnet: Modular Attention Network for Referring Expression Comprehension", Proceedings of the IEEE Conference on Computer Vision and Pattern Recognition, 2018 9 pages.

Engilberge, Martin, et al., "Finding Beans in Burgers: Deep Semantic-Visual Embedding with Localization." Proceedings of the IEEE Conference on Computer Vision and Pattern Recognition, 2018 10 pages.

Wu, Hao, et al., "UniVSE: Robust Visual Semantic Embeddings via Structured Semantic Representations", arXiv preprint arXiv:1904.05521 ,2019 10 pages.

* cited by examiner

FIG. 5

JOINT VISUAL-SEMANTIC EMBEDDING AND GROUNDING VIA MULTI-TASK TRAINING FOR IMAGE SEARCHING

TECHNICAL FIELD

This disclosure relates generally to machine-learning techniques. More specifically, but not by way of limitation, this disclosure relates to using a machine-learning multi-task training to generate image search results in a joint visual-semantic embedding and grounding space.

BACKGROUND

Image processing systems are used for providing digital forums in which end users may interact with online content (e.g., by browsing multimedia content, searching for multimedia content, purchasing multimedia content, commenting on multimedia content, sharing multimedia content, etc.). Image processing systems use modeling algorithms that involve techniques such as content filtering, pattern recognition, semantic relationship identification, user profiling, etc. These image processing algorithms enable users to search for and locate desirable multimedia content related to various content of interest. Deficiencies in such rules or models often result in content searches that suffer from inaccuracies between the content search and search results and include processing inefficiencies associated with computer-based methods.

SUMMARY

Certain embodiments involve methods, systems, and non-transitory computer-readable medium having instructions stored thereon for generating a search result using a joint visual-semantic embedding and grounding model. For example, embodiments described herein can generate a search result having image results using textual information obtained from a text input that more closely matches a search query than other images. One example method includes one or more processing devices performing operations that includes receiving, by a joint embedding model trained to generate an image result, a search query having a text input. The joint embedding model is trained by accessing training data having a set of images and textual information. The joint embedding model is further trained by encoding the set of images into image feature vectors based on spatial features associated with each image. Further, The joint embedding model is trained by encoding the textual information into textual feature vectors based on semantic information associated with the textual information. In addition, the joint embedding model is further trained by generating a set of image-text pairs for the set of images based on matches between the image feature vectors and the textual feature vectors. The joint embedding model is further trained by generating a visual grounding dataset for the set of images based on spatial information associated with the textual information. Further, the joint embedding model is trained by generating a set of visual-semantic embeddings for the set of images based on the set of image-text pairs using the visual grounding dataset. Additionally, the operations include generating, for display, an image result using the joint embedding model by retrieving the image result based on the text input.

Other embodiments described herein can perform machine-learning multi-task training to generate search results having image results in a joint visual-semantic embedding and grounding space. For instance, another example method includes one or more processing devices performing operations that includes accessing training data having a set of images and textual information. The operations further include encoding the set of images into image feature vectors based on spatial features associated with each image. Further, the operations include encoding the textual information into textual feature vectors based on semantic information associated with the textual information. In addition, operations include generating a set of image-text pairs for the set of images based on matches between the image feature vectors and the textual feature vectors. The operations further include generating a visual grounding dataset for the set of images based on spatial information associated with the textual information. Additionally, the operations include generating a set of visual-semantic embeddings for the set of images based on the set of image-text pairs using the visual grounding dataset.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of this disclosure are better understood when the following Detailed Description is read with reference to the accompanying drawings.

FIG. 5 depicts another example of generating, for display, image results using a joint embedding model trained by joint visual-semantic embedding and grounding via multi-task training, according to certain embodiments of this disclosure.

DETAILED DESCRIPTION

Figure 1:
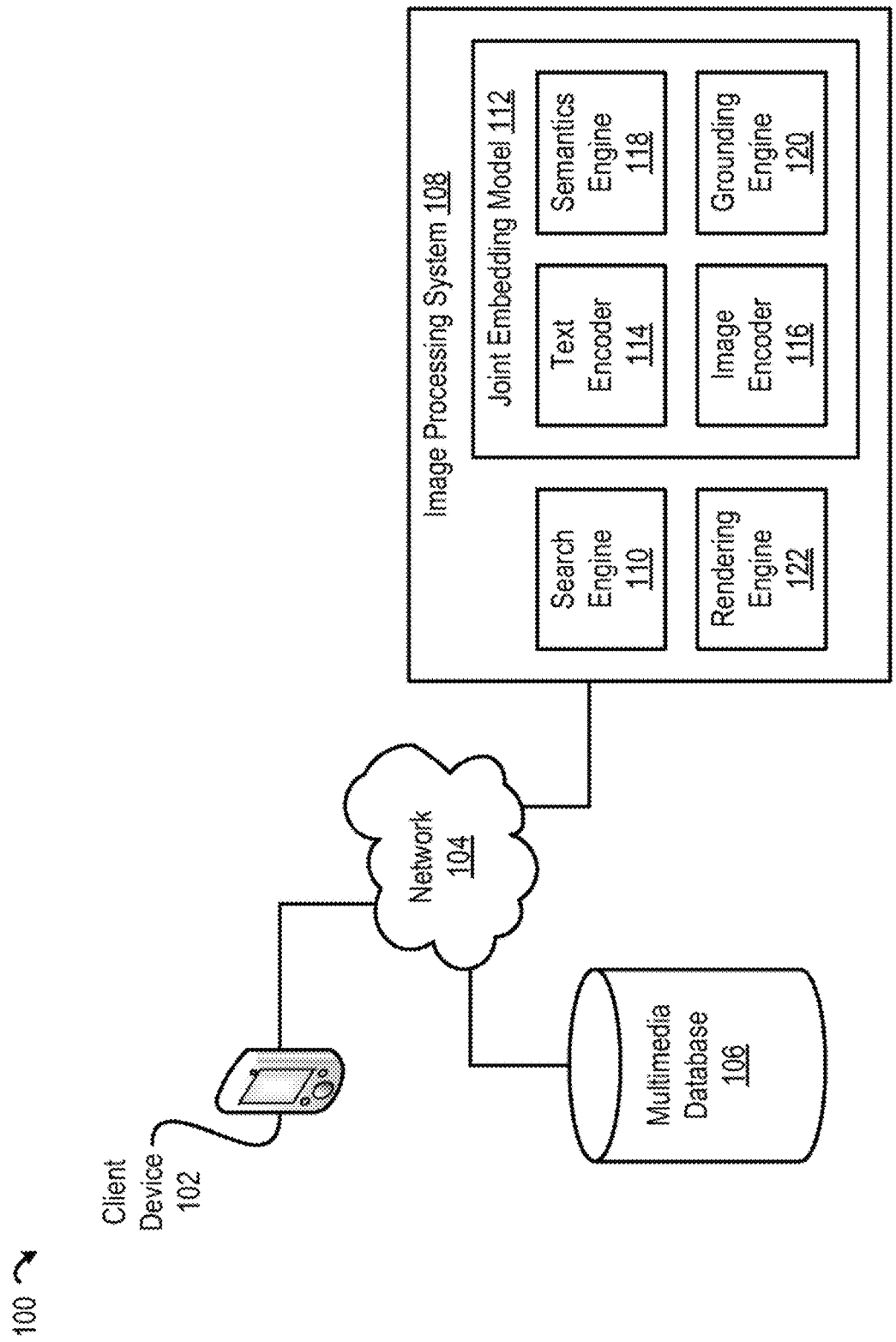
FIG. 1 depicts an example of a computing environment for image searching using joint visual-semantic embedding and grounding via multi-task training, according to certain embodiments of this disclosure.

Certain embodiments of this disclosure involve using a joint embedding model to generate a search result having image results using textual information obtained from a text input that more closely matches a search query than other images. Conventional solutions for search result generation based on text inputs limit the ability to convey accurate and coherent information to an audience. Some conventional solutions include computer-based methods that generate search results having image results in response to a search query may involve matching visual and textual information using an entire image, generic search terms, or separate systems for visual and textual matching. That is, the inaccurate nature of some computer-based methods search result generation limits the actual benefit provided by software tools that perform the search result generation. Moreover, a complexity associated with training the models used by these computer-based methods to generate search results having image results may limit an effectiveness of search result generation based on limited availability of training data or increasing processing costs.

Certain embodiments described herein address these issues by, for example, generating a fine-grained, localization-based search result in response to a search query (e.g., a text input, image input, or a combination of these). The following non-limiting examples are provided to introduce certain embodiments. In one example, an image processing system facilitates image searching by receiving a search query via text input (e.g., a search term or search string). The search query includes textual information corresponding to an image retrieval request associated with an object of interest (e.g., a visual representation of a person, place, or thing occurring in one or more images). In some examples, the search query may include textual information that provides semantic information about the object (e.g., a description, characteristic, spatial relationship, etc.). In one example, the image processing system uses a machine learning model (e.g., a joint embedding model) that is trained to retrieve a search result having image results by identifying candidate image results. In this example, the joint embedding model is trained to retrieve the candidate image results based on multi-task training performed in a joint embedding space.

For instance, training the joint embedding model may involve multitasking by simultaneously generating a set of image-text pairs and a visual grounding dataset. In one example, training the joint embedding model includes accessing training data. For instance, the joint embedding model can access a database that includes training images (e.g., a set of untrained images). The joint embedding model can also access a database that includes a set of training texts (e.g., a set of untrained sentences).

In one example, the joint embedding model encodes the training images into image feature vectors based on spatial features associated with each image. The joint embedding model also encodes the training texts into textual feature vectors based on textual information (e.g., semantic information, spatial information, contextual information, etc.) associated with the training texts. In addition, the joint embedding model determines image-text pairs based on semantic relationships between untrained images with image feature vectors that match the textual feature vectors. In some examples, the semantic relationships between untrained images and untrained sentences may be defined by a matching score (e.g., a number of matches) or a weighted matching score (e.g., a number of matches weighted based on a relevance of one or more parameters, image feature vectors, textual feature vectors, etc.). The joint embedding model also determines a visual grounding dataset for the set of untrained images based on spatial information derived from the textual information.

Further, the joint embedding model applies the visual grounding dataset to the set of image-text pairs to generate a set of visual-semantic embeddings based on matching scores associated with each image. These matching scores are generated under the supervision of the visual grounding dataset. For instance, the supervision provided by the visual grounding dataset focuses the generation of the number of matches for the matching scores on fine-grained, localized regions in the training images. In some examples, the visual grounding dataset can provide a grounding loss associated with the set of visual-semantic embeddings. For instance, the grounding loss may be used by the joint embedding space to generate a subset of the set of visual-semantic embeddings by eliminating training images that are not visually grounded in accordance with the visual grounding dataset.

In some examples, training the joint embedding model involves sorting training images based on their respective matching scores. Further, training the joint embedding model can include determine relevance rankings for training images based on their respective matching scores. In some examples, the joint embedding model can generate relevance rankings for training images based on visual grounding data. For example, the joint embedding model can use visual grounding data to supervise the determination and sorting of relevance rankings based on a prominence of a characteristic within one or more regions of each training image.

In some examples, the joint embedding model can be trained to identify multiple matching images (e.g., candidate image results). In some examples, the joint embedding model can retrieve multiple candidate image results. In addition, the joint embedding model may determine relevance rankings from among the multiple candidate image results based on a matching score (e.g., a number of matches between textual information obtained from the search query and image feature vectors associated with the candidate image results). Further, in some examples, the joint embedding model can be trained to determine a relevance ranking for each image result among the image results (e.g., by sorting image results based on a number of similarities to training images having similar features and/or matching scores). In some examples, the joint embedding model provides relevance rankings for image results to the image processing system. In some examples, image processing system can generate, for display, an image result based on a highest relevance ranking from among the image results. In additional or alternative embodiments, the image processing system renders a plurality of image results based on their respective relevance rankings. The joint embedding model sends these candidate image results to the image processing system.

In some examples, the image processing system can select a subset of candidate image results as image results. In some examples, the image processing system selects results based on one or more criterion (e.g., a screen size of a client device, a resolution of the image, the number of matches, a predetermined number of results associated with the query, a default setting, a combination of these, etc.). The image processing system generates, for display, one or more image results based on the candidate image results (or a subset of the candidate image results). In some examples, the image processing system may arrange the image results based on relevance rankings associated with each of the candidate image results or relevance rankings obtained from the joint embedding model. In some examples, the image processing system can use a combination of a characteristic of an object and regions associated with visual grounding data to generate image results. Further, in some examples, a candidate image result may include regions having a higher relevance ranking than another candidate image result.

In one example, the image processing system generates search results having image results for search queries of a person. In one example, the image processing system receives a text input for a search query requesting retrieval of a "blonde fashion model," and uses the joint embedding model to generate image results based on a set of visual-semantic embeddings. For example, the joint embedding model may have been trained to recognize images having image feature vectors associated with "fashion models." Further, the joint embedding model may have been trained to recognize images having visual grounding data associated with one or more relevant visual characteristics (e.g., a region of an image visually grounded by hair, blonde hair, a particular hue or pixel value associated with blonde hair color, etc.).

In this example, a first candidate image result having a higher relevance ranking is based on a region corresponding to the hair of a blonde fashion model in the first candidate image result. Further, in this example, the first candidate image result has a higher relevance ranking, with respect to a second candidate image result, based on a prominence of a characteristic within the region. For instance, the higher relevance ranking of the first candidate image result can include: a greater relative amount of blonde hair, a particular yellow hue or pixel value, a pose of the fashion model, a hand placement, an overall size or number of pixels, a close-up shot, a vibrancy of an article of clothing, or any suitable characteristic for determining a relative relevance ranking of the visually grounded first candidate image result with respect to the second candidate image result.

In some examples, the image processing system can use a combination of multiple characteristics associated with an object. For instance, the image processing system can receive a search query for multiple characteristics associated with a person (e.g., "attractive young person," "beautiful person smiling," "angry person gesturing and yelling," "friendly businessperson," "worker in a uniform," etc.). The image processing system can generate image results based on a combination of these characteristics. In some examples, a search result may include image results that are visually grounded based on a relevance associated with the overall image. In some examples, the image processing system may receive search queries with textual information that provides a combination of textual information indicating visual characteristics of a desired search result and visual grounding data that provides one or more regions of interest for a highly-relevant, desired search result.

In some examples, the search queries mentioned above may be modified to include additional textual information in each search string, e.g., "close-up of attractive young person," "beautiful person resting and smiling," "angry person gesturing and yelling at boss," "portrait of friendly businessperson," or "worker in a uniform at work." The additional textual information (e.g., "close-up," "resting," "at boss," "portrait of," and "at work") can be utilized by the image processing system as visual grounding data. For example, "close-up" "and "portrait of" can be used to visually ground a candidate image result (or a set of candidate image results) having one or more regions that correspond to particular types of images that are indicated by the visual grounding data. In some examples, the particular types of images may include, e.g., close-ups, portraits, candid, abstract, advertising, architectural, grayscale, or any other type of image that can provide suitable visual grounding data. Further, "resting," "at boss," and "at work," may provide visual grounding data that is used to visually ground regions for image results having particular environmental characteristics.

Continuing with the examples above, image results for a "beautiful person resting and smiling" may include environmental characteristics with regions visually grounded by objects such as a pillow, a person lying down, a person on a couch, a person sitting with their feet up, etc. In addition, image results for the search queries "angry person gesturing and yelling at boss" or "a worker in a uniform at work" may be visually grounded by foreground regions or background regions. For example, the search query for the text input "angry person gesturing and yelling at boss" may cause the image processing system to generate image results depicting a foreground region corresponding to objects such as a suit jacket, tie, briefcase, name tag, or cash register. Similarly, the search query for the text input "a worker in a uniform at work" may cause the image processing system to generate image results depicting a background region such as a cubicle, a retail store parking lot, or a computer on a desk.

As used herein, the term "joint embedding model" is used to refer to a jointly trained model that receives search queries and generates a search result based on simultaneously generated visual-semantic embeddings and visual grounding datasets associated with textual information corresponding to regions within an image. In an example, the joint embedding model is trained with a corpus of unsupervised training data.

As used herein, the term "training data" is used to refer to data or datasets that are input into the joint embedding model to train the joint embedding model. In an example, the training data includes text input data supervised by visual grounding data.

Certain embodiments described herein may facilitate generation of a search result in response to a search query. As an example, existing computer-based methods generate search results based on separate algorithms for visual-semantic pairings or visual groundings, each requiring a separate model. That is, the existing computer-based methods involve generating search results by focusing on aspects of either the semantics relevant to characteristics or regions of an image. Such methods often result in a loss of coherence, accuracy, or both in the search results when compared to the original search query because they don't produce representations of complete thoughts (e.g., sentences) grounded to a region within an image that is associated with the query. Other computer-based methods rely heavily on significant training of models and computationally expensive image analysis techniques. For example, the computer-based methods can require tens of thousands of training examples to train the models used to generate the search results.

These problems can be addressed by features described herein. For instance, search results generated using an image processing system can include image content that is specific to a search query. This image content is selected based on matching textual information from the search query having textual information with a combination of visual semantic relationships associated with the image and visual grounding data (e.g., spatial features within the image itself). The features described herein can allow users to obtain a resulting image in a search result that is relevant to their search query. Thus, embodiments described herein improve computer-implemented processes for querying image content, thereby providing a more suitable solution for automating tasks previously performed by humans.

Example of a Computing Environment for Image Searching Using Joint Visual-Semantic Embedding and Grounding Via Multi-Task Training Referring now to the drawings, FIG. 1 depicts an example of a computing environment 100 for image searching using joint visual-semantic embedding and grounding via multi-task training, according to certain embodiments of this disclosure. In the example computing environment 100 depicted in FIG. 1, various client devices 102 access an image processing system 108 via a data network 104. In some embodiments, as in the example computing environment 100 of FIG. 1, the image processing system 108 includes a search engine 110, a joint embedding model 112, and a rendering engine 122. In additional or alternative embodiments, search engine 110, joint embedding model 112, and rendering engine 122 could be implemented in separate, independently operated computing systems.

The image processing system 108 includes one or more devices that provide and execute one or more modules, engines, applications, etc. for providing one or more digital experiences to the user. The image processing system 108 can be implemented using include one or more processing devices, e.g., one or more servers, one or more platforms with corresponding application programming interfaces, cloud infrastructure, and the like. In addition, each engine can also be implemented using one or more servers, one or more platforms with corresponding application programming interfaces, cloud infrastructure, and the like. The image processing system 108 uses the one or more processing devices to execute suitable program code for performing one or more functions. Examples of this program code include software components depicted in FIG. 1, such as the joint embedding model 112, text encoder 114, image encoder 116, semantics engine 118, and grounding engine 120.

The image processing system 108 can use one or more of these engines to receive a search query having text input from a user, encode textual information (e.g., a symbol, word, phrase, sentence, or a combination of these) obtained from the search query, encode one or more spatial features (e.g., pixels, regions, or three-dimensional objects) in an image, generate image-text pairs based on semantic information (e.g., content tags) associated with an image, generate visual grounding data associated with a particularly relevant region within an image based on semantic relationships or textual information, jointly produce visual-semantic embeddings, selected image content in response the search query, and provide image content in the form of a search result.

In some embodiments, an image processing 108 automatically generates a search result in response to a search query. As described in detail with respect to the various examples below, the image processing system 108 receives a search query for a text input indicating a request for a particular object of interest by executing a search engine 110. The search engine 110 can identify one or more search parameters (e.g., objects or persons of interest, including a description of one or more objects or persons, one or more objects or persons having a particular characteristic, one or more objects or persons having a particular spatial relationship, or any combination of these). In some examples, the image processing system 108 determines a search result for a search query using a nearest neighbor search. In some examples, the search engine 110 tasks a trained joint embedding model to retrieve a search result based on the search parameters.

In some embodiments, the image processing system 108 can train a machine learning model. For example the computing environment 100 depicted in FIG. 1, shows the image processing system 108 including joint embedding model 112. The joint embedding model 112 may be trained using one or more suitable deep learning techniques. Examples of suitable deep learning techniques include techniques using a deep neural network (e.g., a recurrent neural network (RNN), long-short term memory network (LSTM), independent RNN (IndRNN), etc.), a convolutional neural network (e.g., a region convolutional neural network ("R-CNN"), Fast R-CNN, or Faster R-CNN), a deep residual network (e.g., ResNet-101), etc. And in the example shown in FIG. 1, the joint embedding model 112 includes the text encoder 114, the image encoder 116, the semantics engine 118, and the grounding engine 120.

In some embodiments, the joint embedding model 112 accesses a corpus of untrained training data (e.g., training images and training texts). In some examples, the joint embedding model 112 can execute image encoder 116 to encode training images into image feature vectors. And in some examples, the joint embedding model 112 can execute text encoder 114 to encode training texts into textual feature vectors. Further, the joint embedding model 112 can execute semantics engine 118 to generate image-text pairs based on matches between the image feature vectors and the textual feature vectors. The joint embedding model 112 can also execute grounding engine 120 to generate visual grounding data based on spatial relationships associated with the textual feature vectors. The joint embedding model 112, substantially simultaneously, can use the image-text pairs from the semantics engine 118 and visual grounding data from the grounding engine 120 to generate joint visual-semantic embeddings for the training data.

Some embodiments of the computing environment 100 include client devices 102. For instance, the client devices 102 may be operated by client entities (e.g., manufacturers, commercial entities, content providers) requesting images with techniques discussed herein. Such requests can be performed by sending images directly to the image processing system 108 or by requesting retrieval of images from multimedia database 106. In another example, the client devices 102 may be operated by end users that desire to view image content of interest. For instance, end users operating client devices 102 may request retrieval of one or more images from multimedia database 106, an image processing system 108, a search engine 110, a joint embedding model 112, a rendering engine 122, or any combination of these.

Examples of a client device 102 include, but are not limited to, a personal computer, a tablet, a desktop, a server, a mobile device, a smartphone, a processing unit, any combination of these devices, or any other suitable device having one or more processors. A user of a client device 102 uses various products, applications, or services supported by the image processing system 108 via the data network 104.

Each of the client devices 102 are communicatively coupled to the image processing system 108 via the data network 104. Examples of the data network 104 include, but are not limited to, internet, local area network ("LAN"), wireless area network, wired area network, wide area network, and the like.

In the example computing environment 100, the image processing system 108 depicted in FIG. 1 also includes a rendering engine 122. The rendering engine 122 can generate, for display, a search result from the selected image content. The rendering engine 122 includes program code that, when executed by processing hardware, performs one or more operations for generating a search result using a combination of information obtained from the joint embedding model 112 that includes a selection of one or more relevant image results. The rendering engine 122 can combine the abovementioned information to arrange and generate a search result depicting one or more image results that are visually grounded by a particular feature associated with text input of the search query. The selected image results are output as the search result by the rendering engine 122. In one example, outputting the search result may include displaying the search result on a user interface associated with the computing environment 100 (e.g., client device 102). In other examples, outputting the search result may include electronic storage of the search result on a memory associated with the computing environment 100.

In some examples, the rendering engine 122 can output the generated image results as an ordered list of image results based on a relevance associated with each image result. It should be appreciated that the rendering engine 122 may render these image results using any suitable audio visual rendering technique. For instance, rendering engine 122 can generate image results in an organized manner (e.g., by sorting, ranking, numbering, or another hierarchical list). The rendering engine 122 can display such organized images in a number of arrangements (e.g., as a grid, overlay, collage, thumbnail or another suitable arrangement). In addition, the rendering engine 122 can display image results in any suitable image format (e.g., JPEG, TIFF, GIF, BMP, PNG, PGM, MPEG, HEIF, or any other suitable image format).

Examples of Training a Joint Embedding Model Using Joint Visual-Semantic Embedding and Grounding via Multi-Task Training In an illustrative example, the image processing system 108 facilitates image searching by receiving a search query having text input via search engine 110. In this example, the search engine 110 queries a trained machine learning model for one or more objects or persons of interest identified by the search engine based on the textual information. The image processing system 108 identifies a potential search result having one or more image results using the trained machine learning model (e.g., joint embedding model 112). The joint embedding model 112 identifies images based on training that includes matching textual information and visual grounded images via a multi-task approach.

Training the joint embedding model 112 includes accessing training data having a set of images and textual information. For instance, the joint embedding model can access a database (e.g., multimedia database 106) that includes training images (e.g., a set of untrained images). The joint embedding model can also access multimedia database 106 that includes a set of training texts (e.g., a set of untrained sentences). In some examples, the joint embedding model 112 can simultaneously access a corpus of untrained training data (e.g., training images and training texts).

In one example, the joint embedding model 112 obtains a corpus of training data (e.g., images, words, symbols, phrases, or sentences) from the multimedia database 106. In some examples, the training data includes a combination of shared data (e.g., shared parameters, weights, layers, gradients, classifications, etc.) from the multimedia database 106. In some examples, the training data includes a set of images. In some examples, the training data includes a set of untrained images. Further, in some examples, the training data includes textual information. In some examples, the training data includes a set of textual information. In some examples, the training data includes a set of untrained textual information. In some examples, the training data includes textual information with a particular text classification. For example, a set of textual information can include sentences only. In some examples, textual information can include sentences, paraphrased sentences, phrases, words, characters, symbols, syntactic structures, semantic structures, or a combination of these.

Training the joint embedding model 112 further includes encoding the set of images into image feature vectors based on spatial features associated with each image. For example, the joint embedding model 112 detects and identifies image features (e.g., shapes, objects, articles, colors, spatial relationships) associated with each of the training images. The joint embedding model 112 encodes, for each image of the training images, these image features into image feature vectors. In some examples, the joint embedding model 112 can execute image encoder 116 to encode training images into image feature vectors. In one example, the joint embedding model 112 executes image encoder 116 to encode spatial features (e.g., visuospatial features, objects, regions, artifacts, persons, watermarks, quartiles, etc.) into image feature vectors associated with each of the respective images. In some examples, the image encoder 116 may be a convolutional neural network (CNN) acting as an image encoder. For example, the CNN may be capable of generating a 7×7 feature map associated with an image.

In one example, the joint embedding model 112 executes text encoder 114 to encode images in the training data with textual information. In some examples, text encoder 114 detects and identifies textual features (e.g., word frequency, linguistic information, semantic information, word order, sentence structure, word classification, word length, synonyms, etc.) associated with each of the training texts. For example, text encoder 114 encodes, for each text of the training texts, these textual features into textual feature vectors. In one example, the text encoder 114 may include a LSTM, which acts as a language encoder. For instance, the LSTM can encode sentences or phrases into textual feature vectors associated with each of the respective images. In this example, the joint embedding model 112 multitasks by using both the image feature vectors and the image feature vectors substantially simultaneously to generate a set visual-semantic embeddings that are visually grounded to one or more regions or sub-regions within an image.

In addition, training the joint embedding model 112 includes generating a set of image-text pairs for the set of images based on matches between the image feature vectors and the textual feature vectors. For example, the joint embedding model 112 determines matches between the image feature vectors associated with the set of training images and the textual feature vectors associated with the set of training texts. The joint embedding model 112 uses these matches to generate a set of image-text pairs. In some examples, the joint embedding model 112 can determine a relevance for a particular training image based on a number of the matches between the image feature vectors associated with the particular training image and a particular textual feature vector.

In this example, the joint embedding model 112 executes a semantics engine 118 to determine image-text pairs based on semantic relationships between untrained images with image feature vectors that match the textual feature vectors. The semantics engine 118 generates the set of image-text pairs using the most relevant image-text pairs associated with an image based on the textual information. For example, the semantics engine 118 obtains the textual feature vectors and image feature vectors from the text encoder 114 and the image encoder 116, respectively. The semantics engine 118 identifies the semantic relationships between untrained images and untrained sentences based on a matching score (e.g., a number of matches) for matching textual feature vectors and image feature vectors. In some examples, the semantics engine 118 can identify semantic relationships based on a weighted matching score (e.g., a number of matches weighted based on a relevance of one or more parameters, image feature vectors, textual feature vectors, etc.) for matches between respective textual feature vectors and image feature vectors. In some examples, the semantics engine 118 can project textual feature vectors and image feature vectors into the joint embedding space using a projection layer.

In some examples, training the joint embedding model 112 involves sorting training images based on their respective matching scores. In one example, the joint embedding model 112 obtains the matching scores from the semantics engine 118. In this example, the joint embedding model 112 can determine a relevance ranking for each training image with respect to each training text based on their matching scores. In some examples, the joint embedding model 112 can generate relevance rankings for training images based on a characteristic. For example, the joint embedding model 112 can use image feature vectors or textual feature vectors to determine relevance rankings among the set of image-text pairs based on a presence (or absence) of one or more characteristics associated with each respective training image.

Training the joint embedding model 112 further includes generating a visual grounding dataset for the set of images based on spatial information associated with the textual information. The joint embedding model 112 determines the visual grounding dataset for the set of untrained images based on spatial information derived from the textual information. For example, the joint embedding model 112 can substantially simultaneously execute a grounding engine 120 to generate a visual grounding dataset (e.g., visual grounding data associated with each image of the set of images) using the most relevant feature vectors associated with the same image based on the textual information. When performed together, the joint embedding model 112 generates a set of grounding results that incorporate both the most relevant image-text pairs obtained from the semantics engine 118 and the most relevant feature vectors obtained from the grounding engine 120. In this example, the image processing system 108 generates a search result by employing a relevance ranking to determine the most relevant grounding result(s) from among the set of grounding results based on the textual information associated with text input of the search query. In some examples, the joint embedding model 112 execute software using a shared network (e.g., the same multi-layer neural network).

Further, training the joint embedding model 112 includes generating a set of visual-semantic embeddings for the set of images based on the set of image-text pairs using the visual grounding dataset. In some examples, the joint embedding model 112 multitasks by using both the image feature vectors and the image feature vectors substantially simultaneously to generate a set visual-semantic embeddings that are visually grounded to one or more regions or sub-regions within an image. In one example, the joint embedding model 112 applies the visual grounding dataset to the set of image-text pairs to generate a set of visual-semantic embeddings based on matching scores associated with each image. These matching scores are generated under the supervision of the visual grounding dataset.

For instance, the supervision provided by the visual grounding dataset focuses the generation of the number of matches for the matching scores on fine-grained, localized regions in the training images. In some examples, the visual grounding dataset can provide a grounding loss associated with the set of visual-semantic embeddings. In one example, the grounding loss may be used by the joint embedding space to generate a subset of the set of visual-semantic embeddings by eliminating training images that are not visually grounded in accordance with the visual grounding dataset. In some examples, the joint embedding model 112 can generate relevance rankings for training images based on visual grounding data. For example, the joint embedding model 112 can use visual grounding data to supervise the determination and sorting of relevance rankings based on a prominence of a characteristic within one or more regions of each training image.

In one example, the joint embedding model 112 generates visual-semantic embeddings using the following bi-directional triplet ranking loss expression.

$$\ell_{MH}(i, t) = \max_{t'}[\alpha + s(i, t') - s(i, t)]_+ + \max_{i'}[\alpha + s(i', t) - s(i, t)]_+$$

Here, the term i represents an image, the term c represents text, a represents a margin, the term (i, t) represents any positive (e.g., corresponding) image-text pairs, (i, t') and (i', t) represents any negative (e.g., non-corresponding) image-text pairs. The terms $[x]_+$ represent maximum operations for determining respective hardest negative image-text pairs used to calculate the bi-directional triplet ranking loss ($\ell_{MH}$). In additional or alternative embodiments, the joint embedding model 112 can be trained using a sigmoid cross entropy loss calculation.

Figure 2:
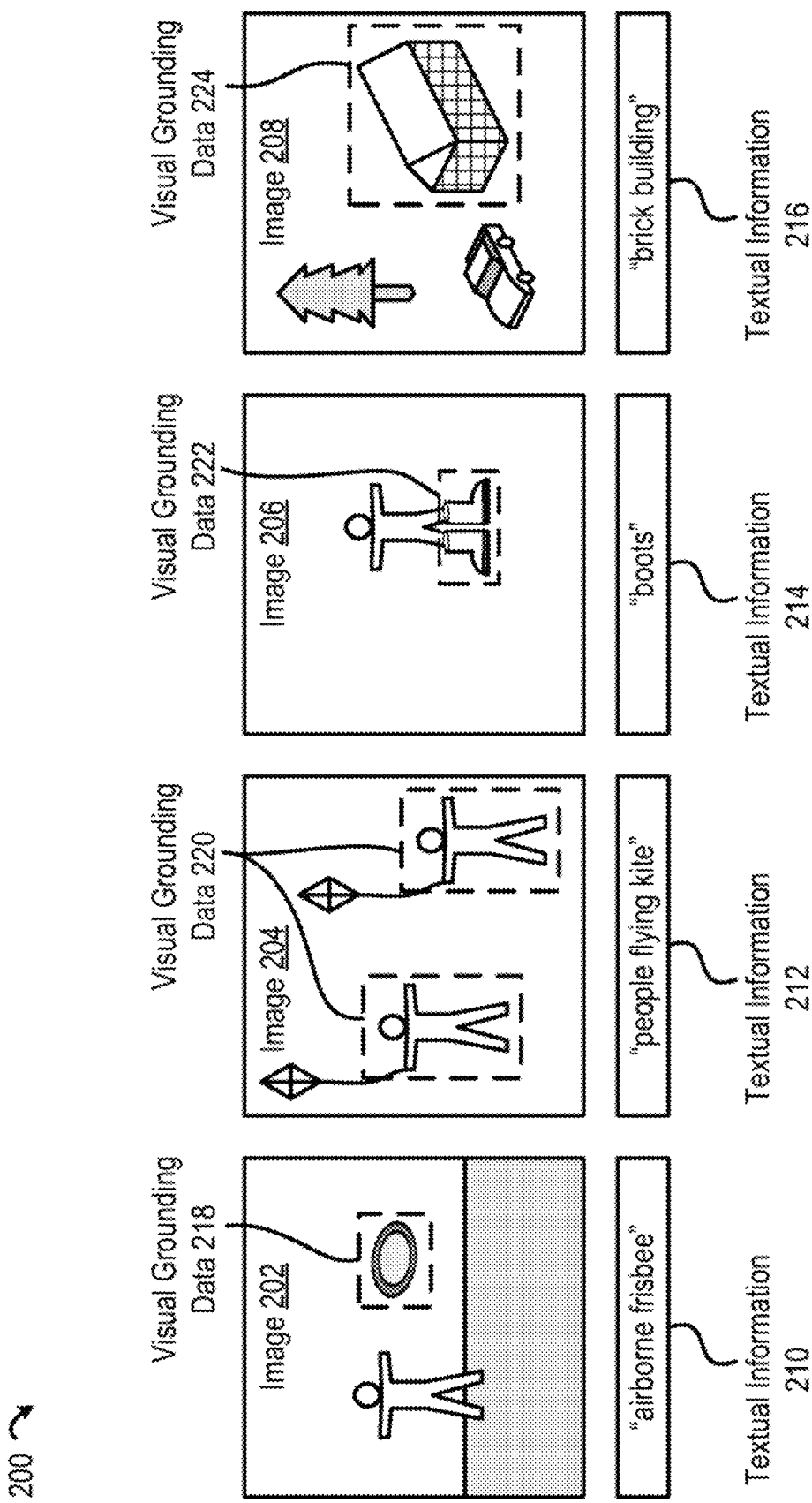
FIG. 2 depicts an example of joint visual-semantic embedding and grounding via multi-task training, according to certain embodiments of this disclosure.

The following example is provided to illustrate a potential application of the operations described above. In particular, FIG. 2 depicts an example 200 of joint visual-semantic embedding and grounding via multi-task training, according to certain embodiments of this disclosure. In the example 200 depicted in FIG. 2, In this example, an image processing system 108 executes a joint embedding model 112. The joint embedding model 112 requests access to and receives training data that includes training images (e.g., images 202-208) and training texts (e.g., textual information 210-216). In this example, each of the training images 202, 204, 206, and 208 depict spatial information (e.g., features, objects, relative positions) that provide the basis for image-text pairs associated with textual information 210, 212, 214, and 216, respectively. Further, in this example, images 202, 204, 206, and 208, also include visual grounding data 218, 220, 222, and 224, respectively. The visual grounding data 218, 220, 222, and 224 is derived from the textual information 210, 212, 214, and 216, respectively.

The joint embedding model 112 executes an image encoder 116 and text encoder 114 to extract image feature vectors and textual feature vectors, respectively, associated with each of the images 202-208. In this simplified example, the textual feature vectors include textual information 210-216. The joint embedding model 112 also executes a semantics engine 118 to identify image-text pairs, which includes images 202-208 that correspond to textual information 210-216, respectively. Once trained, the joint embedding model 112 may use these image-text pairs as examples to retrieve candidate image search results based on search queries having similar text inputs, image inputs, or both.

In one example, the semantics engine 118 identifies a matching image-text pair between image 202 based on a match between textual information 210 and the image 202. The semantics engine 118 determines, e.g., the presence of a matching term in a training text phrase "airborne frisbee," provided by the textual information 210 and the presence of a frisbee depicted in the image 202. Substantially simultaneously, the joint embedding model 112 executes a grounding engine (e.g., grounding engine 120) to identify a relevant region within the image 202 based on contextual information obtained from the training text phrase "airborne frisbee." For example, the joint embedding model 112 supervises the identification of the training image 202 by determining a region of the image 202 (e.g., represented by dashed lines) that corresponds to visual grounding data 218. In this example, the grounding engine 120 visually grounds the image 202 based on the training text term "airborne," which provides contextual information about a relative location of the frisbee (e.g., that the frisbee is not at rest, is in motion, and is above a depicted a ground level).

In this example, the training data includes a training text string depicted as textual information 212 (e.g., "people flying kite). But in this example, the joint embedding model 112 determines a matching image-text pair between image 204 and the textual information 212 based a match between on a presence of multiple people flying a kite in the image 204. And in this example, the visual grounding data 220 corresponds to two distinct regions outlined by a dashed line. In addition, the visual grounding data 220 is specific to regions corresponding to people, not the kites, because the "people" are part of the subject of the textual information 212, while "kite" is part of the predicate of the textual information 212.

Continuing with the example 200, the training data includes a training text term depicted as textual information 214 (e.g., "boots"), the image processing system 108 uses joint embedding model 112 in a substantially similar manner to determine an image-text pair between image 206 and the textual information 214 based on the presence of boots within the image 206. In this example, the visual grounding data 222 corresponds to a sub-region outlined by a dashed line. In particular, the visual grounding data 222 is specific to a sub-region associated with a region corresponding to the person depicted wearing the boots in the image 206. Since the person is not the subject matter of the textual information 214, the visual grounding data 222 visually grounds the image 206 to the sub-region (e.g., the boots) corresponding to a larger surrounding region (e.g., the person wearing the boots).

The example 200 also depicts training data including a training text term depicted as textual information 216 (e.g., "brick building"), the joint embedding model 112 also determines an image-text pair between image 208 and the textual information 216 based on the presence of a brick building within the image 208. In this example, the visual grounding data 224 corresponds to a region outlined by a dashed line that encompasses the brick building. In particular, the visual grounding data 224 outlines the region corresponding to the brick building in the image 208, while ignoring regions corresponding to the tree and car depicted in the image 208. Since the brick building is the relevant object associated with the textual information 216, the visual grounding data 224 visually grounds the image 208 to focus on the region outlining the brick building.

Figure 3:
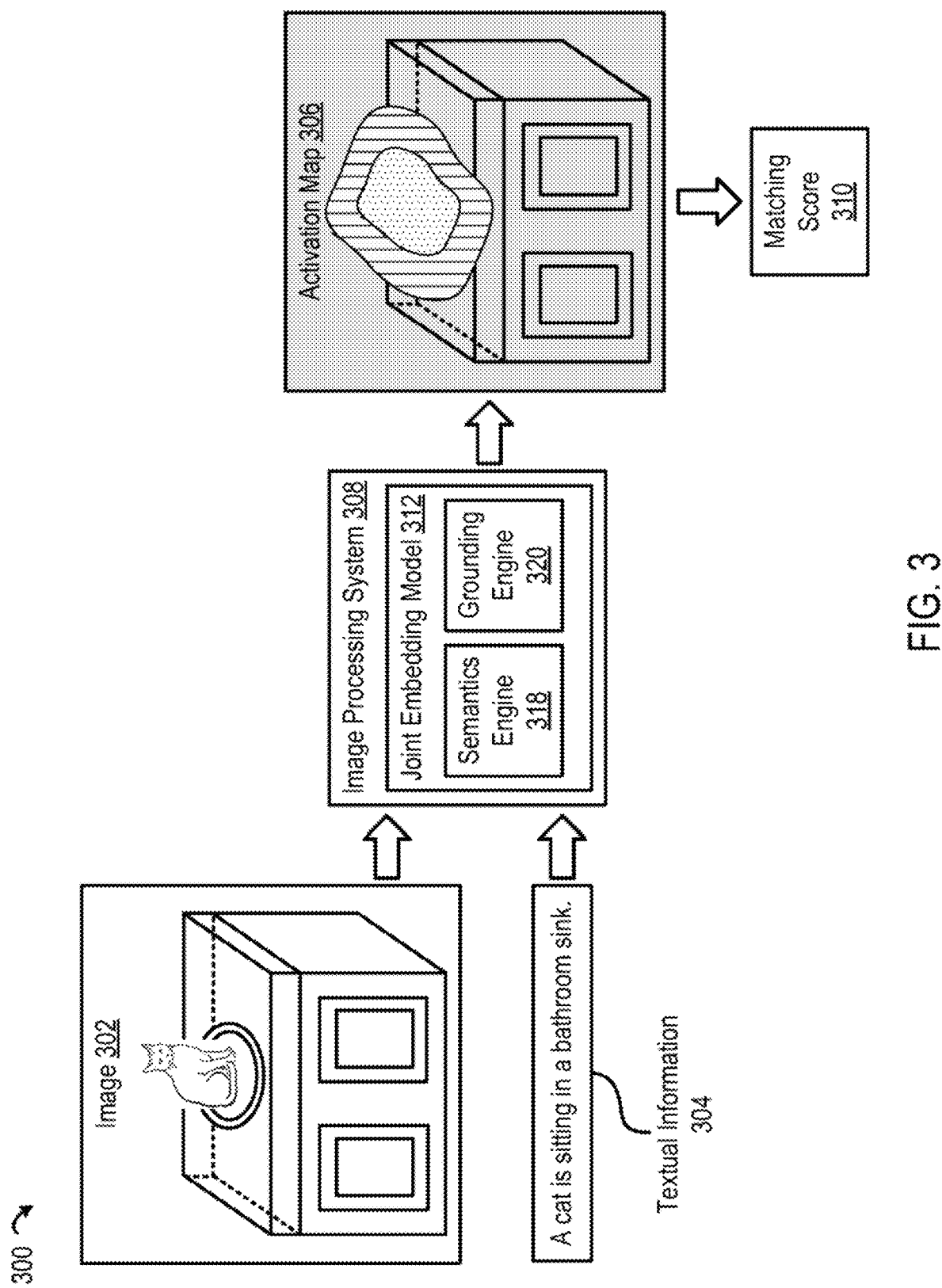
FIG. 3 depicts an example of joint visual-semantic embedding and grounding via multi-task training, according to certain embodiments of this disclosure.

FIG. 3 depicts an example 300 of generating a matching score 310 using joint visual-semantic embedding and grounding via multi-task training, according to certain embodiments of this disclosure. In the example 300 of FIG. 3, an image processing system 308 includes a joint embedding model 312. The joint embedding model 312 includes a semantics engine 318 and a grounding engine 320. The image processing system 308 generally has the same capabilities as described above with respect to image processing system 108 in FIG. 1. In this example, the image processing system 308 executes a joint embedding model 312. The joint embedding model 312 receives training data that includes an image 302 from a multimedia database (e.g., multimedia database 106). The joint embedding model 312 also receives training data from the multimedia database 106 that includes textual information 304. The joint embedding model 312 executes semantics engine 318 and grounding engine 320 to generate visually grounded visual-semantic embeddings based on semantic relationships.

In this example, a single textual feature vector is generated using textual information 304 (e.g., a textual feature vector having a size of 1×512). Further, in this example, after image encoding is performed on the image 302, the joint embedding model 312 also generates an image feature vector (e.g., an image feature vector having a size of 7×7×2048). The joint embedding model 312 processes the image feature vector through a 1×1 convolutional layer to generate a 7×7×512 feature map. However, in some examples, the joint embedding model 312 can generate a 7×7 feature map having one or more textual feature vectors associated with the image 302.

In some examples, the joint embedding model 312 can generate and project a 1×1 convolutional layer of image feature vectors onto a fully connected layer of the 7×7 feature map. Further, in some examples, the joint embedding model 312 calculates a weighted sum of spatial feature maps based on values of the textual feature vectors. In this example, the joint embedding model 312 generates a pooling layer for the 7×7 feature map using the weighted sums to generate an activation map 306 that corresponds to a region associated with the textual feature vectors. In one example, the joint embedding model 312 generates the pooling layer by performing an average pooling. It should be appreciated that the pooling layer may be generated according to any suitable pooling technique (e.g., average pooling, max pooling, global pooling, global max pooling, region of interest pooling, etc.). Thus, the joint embedding model 312 can generate joint-visual semantic embeddings (e.g., corresponding to 1×512 image feature vectors) by applying one or more pooling techniques to corresponding feature maps (e.g., a 7×7×512 feature map).

In this example, the semantics engine 318 identifies a number of matches between the textual information 304 and the image 302 based at least on a number of matching objects in image 302 that are associated with the textual information 304 (e.g., a number of six matches could include "A cat," "A cat sitting," "in a bathroom," "in a sink," and "in a bathroom sink"). Substantially at the same time, the grounding engine 320 supervises the semantics engine 318 by focusing on a region of the image 302 corresponding to the cat in the sink. In this example, the number of matches may be reduced to create a subset of the number of matches by using the most relevant region of the image 302 under the supervision of the grounding engine 320 (e.g., a subset of a number of four matches could include "A cat," "A cat sitting," "in a sink," and "in a bathroom sink"). The joint embedding model 312 may generate the matching score 310 based on the number of matches or the subset of the number of matches visually grounded to the particular region of the image 302. In some examples, the joint embedding model 312 may generate a number of matches or a subset of the number of matches based on weighted sums. For example, the joint embedding model 312 may assign a weighted value to textual feature vectors associated with the subject matter (e.g., text input) of a search query. In some examples, the joint embedding model 312 may assign different weighted values to textual feature vectors associated with the predicate of the search query.

Figure 4:
FIG. 4 depicts an example of generating, for display, image results using a joint embedding model trained by joint visual-semantic embedding and grounding via multi-task training, according to certain embodiments of this disclosure.

Examples of Generating, for Display, Search Results Using a Joint Embedding Model Trained by Joint Visual-Semantic Embedding and Grounding via Multi-Task Training FIG. 4 depicts examples 400 of image searching and image search results using joint visual-semantic embedding and grounding via multi-task training, according to certain embodiments of this disclosure. In the example 400, an image processing system (e.g., image processing system 108) receives a search query (e.g., query 404) for "[b]eautiful red tulips against the blue sky." In response, the image processing 108 uses a joint embedding model (e.g., joint embedding model 112) to retrieve search results (e.g., results 406). In this example, the image processing system 108 generates results 406 for display using a rendering engine (e.g., rendering engine 122). The rendering engine 122 provides a graphical user interface (e.g., display 402), displaying the query 404, results 406, a menu 408, and images 410-428. In some examples, the rendering engine 122 transmits a display signal that causes a client device (e.g., client device 102) to output display 402. It should be appreciated that image processing 108 may generate results 406 according to any of the techniques discussed herein.

In this example, a user enters text input for a search query for a particular object associated with a particular location. In particular, a user provides a text input of query 404 for "[b]eautiful red tulips against the blue sky." The image processing system 108 receives query 404 and executes the joint embedding model, which is trained to retrieve a set of images that includes images 410-428. The image processing system 108 identifies the images 410-428 based on visual-semantic embeddings associated with each word (e.g., "beautiful," "red," "tulips," "against," "the," "blue," "sky"), one or more phrases (e.g., "beautiful red tulips," "against the blue sky," or both), or a sentence (e.g., by inserting a word or phrase into the query, such as a "beautiful red tulips [set] against the blue sky").

In some examples, the joint embedding model 112 can use visual-semantic embeddings to identify a set of images that includes both beautiful red tulips (e.g., red color tulips that are aesthetically pleasing, substantially symmetrical, a numerous amount, having a pixel value or intensity associated with a bright red color) and a blue sky. In this example, the image processing system 108 simultaneously identifies a subset of the set of images (e.g., images 410-428) associated with the visual-semantic embeddings using visual grounding data. For instance, the search query includes contextual information that provides visual groundings for images 410-428 identified based on the visual-semantic embeddings. The visual groundings associated with this search query include relative positions associated with a desired search result based on the textual information, e.g., the search term "against." The image processing system 108 utilizes this search term to provide visual groundings that generate one or more search results depicting a "beautiful red tulip" in a foreground of an image, set "against" a background of an image that depicts a "blue sky."

In some examples, the joint embedding model 112 can rank candidate image results based on a number of matches. For example, joint embedding model 112 can determine a number of matches based on similarities between candidate image results using visual-semantic embeddings and visual grounding data. In this example, the joint embedding model 112 retrieves a set of candidate image results based similarities to visual-semantic embeddings associated with training images (e.g., a number of red tulips) and visual grounding data (e.g., training images having foregrounded tulips). The joint embedding model 112 selects a subset of the candidate image results (e.g., images 410-428) based on these similarities. Further, the joint embedding model 112 selects images 410-428 can select a top ten highest number of matches, e.g., images 410-428, from among the candidate image results.

The joint embedding model 112 sends the images 410-428 to the image processing system 108. The image processing system executes rendering engine 122. The rendering engine 122 generates, for display, the results 406. In additional or alternative embodiments, the rendering engine generates the results 406 in an order according to a relevance ranking associated with each of the images 410-428. For example, the images 410-428 can be displayed according to their respective relevance rankings. In this example, image 410 has the highest relevance ranking among the top 10 results 406, followed by a second highest relevance ranking of image 412, which follows in substantially sequential order until the tenth highest relevance ranking of image 428.

In additional or alternative embodiments, the joint embedding model 112 can determine a similarity score based on visual-semantic embedding generated during training for similar training images (e.g., similar to images based on a matching score 310) based on one or more weights applied to the number of matches. For instance, the image processing system 108 can weight images based on any number of characteristics associated with a candidate image result. For example, the joint embedding model 112 may retrieve candidate image results based on similarity scores related to a vibrancy of colors within the image, a camera angle associated with the image, a brightness of the red tulips in the foreground, a focal point, an amount of visual distortion, the presence of an undesirable artifact, an amount of sunlight depicted in background blue sky, a number of clouds within the image, an overall percentage of the image that is either red or blue, etc. In some examples, the image processing system 108 can adjust a relevance ranking based on a weighted matching score.

Figure 5:
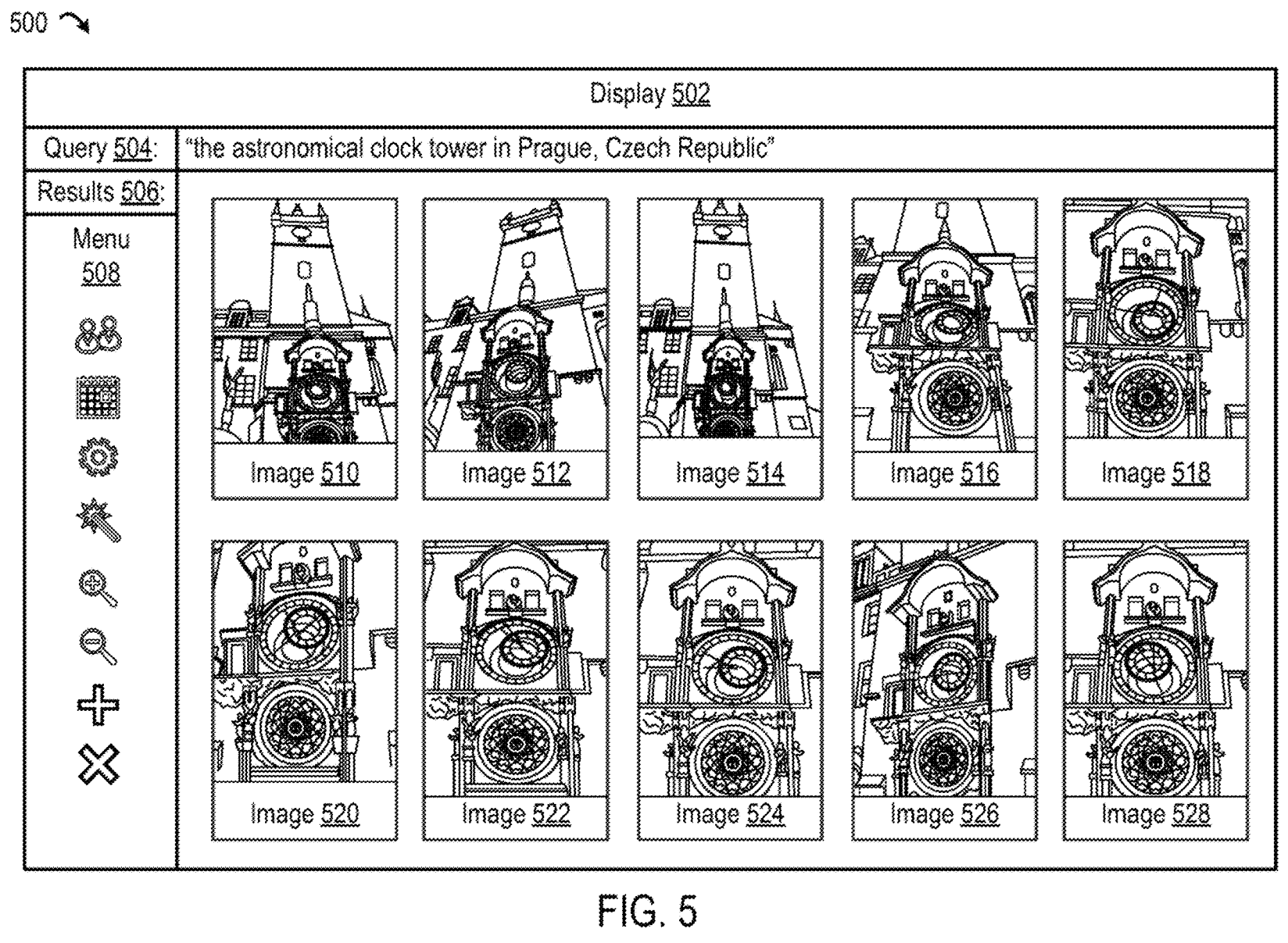

FIG. 5 depicts example 500 of image searching and image search results using joint visual-semantic embedding and grounding via multi-task training, according to certain embodiments of this disclosure. In FIG. 5, an image processing system 108 receives a query 504 for "the astronomical clock tower in Prague, Czech Republic" from a client device 102 across a data network 104. The image processing 108 uses a joint embedding model 112 to retrieve results 506. The image processing system 108 generates results 506 for display using a rendering engine 122. The rendering engine 122 generates display 402 depicting the query 504, results 506, a menu 508, and images 510-528. The rendering engine 122 transmits a display signal that causes the client device 102 to output display 502.

In this example, a user provide a text input of a query 504 for "the astronomical clock tower in Prague, Czech Republic." The image processing system 108 receives the query 504 and executes the trained joint embedding model 112. The joint embedding model 112 accesses multimedia database 106 to retrieve a set of images that includes images 510-528. The joint embedding model 112 identifies the images 510-528 based on visual-semantic embeddings. For example, the joint embedding model 112 may have been trained using training images associated with each word (e.g., "the," "astronomical," "clock," "tower," "in," "Prague," "Czech," "Republic), one or more phrases (e.g., "the astronomical clock tower," "in Prague, Czech Republic," or both), or the sentence as a whole (e.g., "the astronomical clock tower in Prague, Czech Republic").

In some examples, the joint embedding model 112 identify image content based on parsed phrases of a text input. For instance, the joint embedding model 112 can determine the phrase "the astronomical clock tower" may be parsed into two phrases (e.g., "the astronomical clock" and "the clock tower"). In this example, the joint embedding model 112 identifies a set of images that is related to both astronomical clocks (e.g., clocks that display astronomical information such as relative positions of the sun, moon, constellations, or major planets) and clock towers. By using variations of the phrases with in the textual information, the joint embedding model 112 can determine one or more candidate image results that are associated with astronomical clock towers (e.g., Le Gros Horioge in Rouen, France, replicas of Su Sung's Cosmic Engine in London, United Kingdom and in Taichung City, Republic of China, the astronomical clock in Strasbourg, Alsace, France, etc.).

Continuing with this example, the joint embedding model 112 identifies a subset of the set of images (e.g., candidate image results) associated with the text input of the search query. For instance, the joint embedding model 112 can use the text input to determine textual information associated with the search query. In this example, the joint embedding model 112 obtains textual information that provides contextual information used to retrieve candidate images, including images 510-528 based on the contextual information. For instance, the joint embedding model 112 can determine contextual information from the textual information that provides a geospatial relationship associated with more relevant candidate image results that include content tags or image feature vectors associate with Prague, Czech Republic. For instance, the on the contextual information. For instance, the joint may retrieve candidate image results based on a specific geolocation associated with the astronomical clock tower in Prague, Czech Republic (e.g., a geotag corresponding to the location of the astronomical clock tower in Prague, Czech Republic). In addition, the joint embedding model 112 may utilized the geotag to generate more accurate search results. For instance, the joint embedding model 112 may select a subset of a subset of candidate image results (e.g., image results or images 510-528) based on a presence of the geotag.

The joint embedding model 112 uses the phrase "in Prague, Czech Republic" to identify image results, e.g., images 510-528, that are associated with both the text input above and are visually grounded by the particular astronomical clock tower located in Prague, Czech Republic. Further, in some examples, joint embedding model 112 can retrieve image results based on features unique to the image results. As mentioned above, each of the images 510-518 may include a geotag corresponding to the geolocation of the astronomical clock tower. In other examples, the images 510-518 may include one or more of the four figures adjacent to the astronomical clock tower, one or more spatial relationships of the zodiacal ring of the astronomical clock tower, a particular color of a region of the astronomical clock tower, etc.).

In some cases, certain computer-based methods may employ the usage of a single term on its own, which may produce less ideal results. For instance, in the example above of a search query for "the astronomical clock tower in Prague, Czech Republic," the search term "in" alone provides some contextual information that a particular location or region within an image may be relevant visual grounding data to the image. Similarly, each search term "Prague," "Czech," and/or "Republic" can provide some contextual information. But search engines that include computer-based methods using each word, or even shorter phrases, may produce erroneous results. In one example, using the term "Prague" on its own may produce suboptimal search results. For instance, other computer-based methods may identify visual-semantic embeddings for a more common object than an astronomical clock tower, which may lead to erroneous search results due to the existence of multiple locations associated with the search term "Prague" (e.g., Prague, Oklahoma, Prague, Nebraska, or New Prague, Minnesota). In another example, the use of "Republic" alone may result in erroneous image search results of the replica of Su Sung's Cosmic Engine in Taichung City, Republic of China. In addition, other computer-based methods may use shorter, parsed, or incomplete phrases such as "Czech Republic." But this can also generate erroneous image search results, e.g., of the astronomical clock in Olomouc, Czech Republic.

Figure 6:
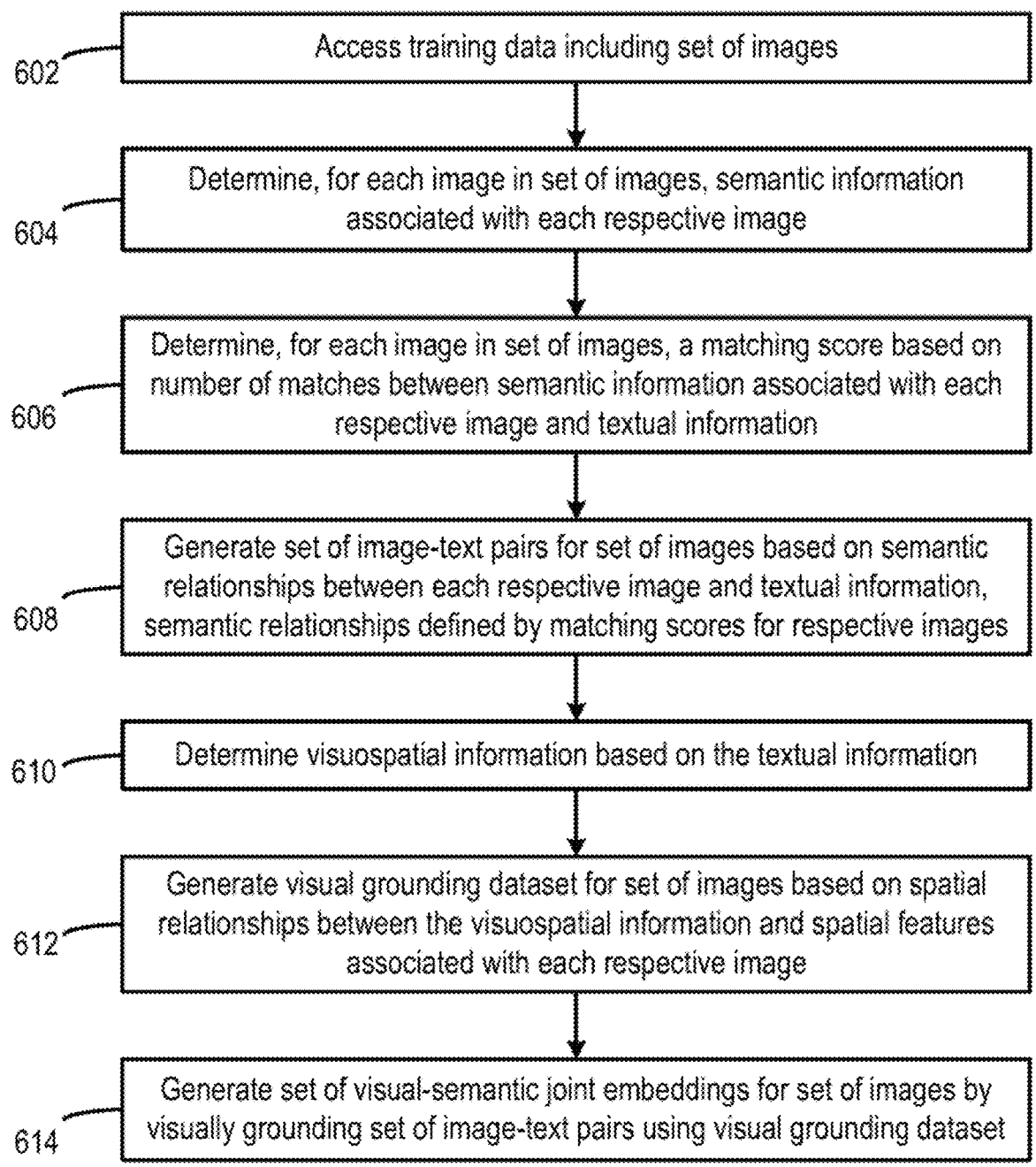
FIG. 6 depicts an example of a process training a joint embedding model using joint visual-semantic embedding and grounding via multi-task training, according to certain embodiments of this disclosure.

Example Method for Training a Joint Embedding Model by Joint Visual-Semantic Embedding and Grounding via Multi-Task Training FIG. 6 is an example of a process 600 of training joint visual-semantic embedding and grounding via multi-task training for image searching, according to certain embodiments of this disclosure. One or more operations described with respect to FIG. 6 can be used to implement a step for image searching using a joint embedding model (e.g., joint embedding model 112) via multi-task training based on visually grounded visual-semantic embeddings. One or more processing devices (e.g., computing environment 100) implement operations depicted in FIG. 6 by executing suitable program code (e.g., joint embedding model 112). For illustrative purposes, the process 600 is described with reference to certain examples depicted in the figures. Other implementations, however, are possible.

At block 602, the process 600 involves accessing training data that includes a set of images and textual information. For example, an joint embedding model 112 accesses a database of multimedia content (e.g., multimedia database 106) to retrieve training data. In some examples, the joint embedding model can access multimedia database 106 to obtain training images, training texts having textual information, other training data, or a combination of these. In one example, the joint embedding model 112 obtains a corpus of training data from the multimedia database 106. In some examples, the training data includes a combination of shared data from the multimedia database 106.

In this examples, the training data includes a set of images. In some examples, the training data may include a set of untrained images. Further, in this example, the training data includes textual information. In some examples, the training data includes a set of textual information. However, in some examples, the training data can include a set of untrained textual information or textual information with a particular text classification. For instance, the training data may include a set of textual information that only contains sentences. In additional or alternative embodiments, textual information can include sentences, paraphrased sentences, phrases, words, characters, symbols, syntactic structures, semantic structures, etc.

At block 604, the process 600 involves encoding the set of images into image feature vectors based on spatial features associated with each image. For example, the joint embedding model 112 detects and identifies image features (e.g., shapes, objects, articles, colors, spatial relationships) associated with each of the training images. The joint embedding model 112 encodes, for each image of the training images, these image features into image feature vectors. In some examples, the joint embedding model 112 can execute image encoder 116 to encode training images into image feature vectors. In one example, the joint embedding model 112 executes image encoder 116 to encode spatial features (e.g., objects, regions, artifacts, persons, watermarks, quartiles, etc.) into image feature vectors associated with each respective image. In some examples, the image encoder 116 may be a CNN acting as an image encoder capable of generating a 7×7 feature map associated with an image.

At block 606, the process 600 involves encoding textual information associated with the training text into textual feature vectors based on semantic information associated with textual information obtained from each text of the training texts. For example, the joint embedding model 112 executes text encoder 114 to encode images in the training data with textual information. In some examples, text encoder 114 detects and identifies textual features (e.g., word frequency, linguistic information, semantic information, word order, sentence structure, word classification, word length, synonyms, etc.) associated with each of the training texts. For example, text encoder 114 encodes, for each text of the training texts, these textual features into textual feature vectors. In one example, the text encoder 114 may include a LSTM, which acts as a language encoder. For instance, the LSTM can encode sentences or phrases into textual feature vectors associated with each of the respective images. In this example, the joint embedding model 112 multitasks by using both the image feature vectors and the image feature vectors substantially simultaneously to generate a set visual-semantic embeddings that are visually grounded to one or more regions or sub-regions within an image.

At block 608, the process 600 involves generating a set of image-text pairs for the set of images based on matches between the image feature vectors and the textual feature vectors. For example, the joint embedding model 112 determines matches between the image feature vectors associated with the set of training images and the textual feature vectors associated with the set of training texts. The joint embedding model 112 uses these matches to generate a set of image-text pairs. In some examples, the joint embedding model 112 can determine a relevance for a particular training image based on a number of the matches between the image feature vectors associated with the particular training image and a particular textual feature vector.

In one example, the joint embedding model 112 executes a semantics engine 118 to determine image-text pairs based on semantic relationships between untrained images with image feature vectors that match the textual feature vectors. The semantics engine 118 generates the set of image-text pairs using the most relevant image-text pairs associated with an image based on the textual information. The semantics engine 118 identifies the semantic relationships between untrained images and untrained sentences based on a matching score (e.g., matching score 310) between matching textual feature vectors and image feature vectors. In some examples, the semantics engine 118 can identify semantic relationships based on a weighted matching score. In some examples, the joint embedding model 112 can determine a relevance of an image-text pair based on a characteristic of an image.

At block 610, the process 600 involves generating a visual grounding dataset for the set of images based on spatial information. The visual grounding dataset provides supervision for the visual-semantic embeddings by focusing the generation of the number of matches associated with the matching score 310 to focus the matches to fine-grained, localized regions in candidate images. The joint embedding model 112 can use one or more software engines (e.g., image encoder 116) to produce visual grounding data for image content. For example, the image encoder 116 can encode one or more spatial features within an image to identify relevant regions within the image. For example, the joint embedding model 112 may determine the visual grounding dataset based on spatial information derived from the textual information. The joint embedding model 112 can generate the visual grounding dataset using the most relevant image feature vectors of an image based on its textual information. In this example, the joint embedding model 112 generates a set of grounding results based on the textual information that are visually grounded to a particular region within an image.

At block 612, the process 600 involves generating a set of visual-semantic embeddings for the set of images based on the set of image-text pairs using the visual grounding dataset. In some examples, the joint embedding model 112 multitasks by using both the image feature vectors and the image feature vectors substantially simultaneously to generate a set visual-semantic embeddings that are visually grounded to one or more regions or sub-regions within an image. In one example, the joint embedding model 112 applies the visual grounding dataset to the set of image-text pairs to generate a set of visual-semantic embeddings based on a subset of matching scores associated with each image. The subset of matching scores are generated under the supervision of the visual grounding dataset.

For instance, the supervision provided by the visual grounding dataset focuses the generation of a number of matches for matching image-text pairs to one or more regions in the set of images. In some examples, the visual grounding dataset can provide a grounding loss associated with the set of visual-semantic embeddings. In one example, the grounding loss may be used by the joint embedding space to generate a subset of the set of visual-semantic embeddings by eliminating training images that are not visually grounded in accordance with the visual grounding dataset. In some examples, the joint embedding model 112 can generate relevance rankings for training images based on visual grounding data. For example, the joint embedding model 112 can use visual grounding data to supervise the determination and sorting of relevance rankings based on a prominence of a characteristic within one or more regions of each training image. In some examples, the joint embedding model 112 generates visual-semantic embeddings using a bi-directional triplet ranking loss expression. In additional or alternative embodiments, the joint embedding model 112 can be trained using a sigmoid cross entropy loss calculation.

In some examples, generating the set of visual-semantic embeddings may involve generating an activation map (e.g., activation map 306) having textual feature vectors associated with regions in the image that are indicated by the visual grounding data. For example, the activation may by generated by pooling the set of image-text pairs and the visual grounding data substantially simultaneously. In some examples, the joint embedding model 112 can replace a fully connected layer of a 7×7 feature map associated with a training image by projecting a 1×1 convolutional layer of image feature vectors onto the fully connected layer. In one examples, the joint embedding model 112 performs an average pooling of the set of image-text pairs and the visual grounding data substantially simultaneously.

In some examples, determining the matching score 310 associated with the image can be reduced based on a number of matches between the sets of visual-semantic embeddings using the visual grounding data. For instance, the image processing system 108 uses the joint embedding model 112 to apply the set of visual-semantic embeddings to generate the matching score 310 based on a number of matches within a particular region associated with a visual grounding. In one example, the particular region may be indicated by a proximity to area within the activation map 306. The matching score 310 is generated under the supervision of the visual grounding dataset to produce a grounding result. Thus, the supervision provided by the visual grounding dataset focuses the generation of the number of matches for the matching score 310 on fine-grained, localized regions in candidate images.

In some examples, the joint embedding model 112 can identify multiple matching images within the set of training images. Further, in some examples, the joint embedding model 112 can determine a relevance ranking for each image among the matching images (e.g., by sorting matching images based on respective matching scores 310). In some examples, image processing system 108 can generate, for display, an image search results based on a highest relevance ranking from among the matching images. In some examples, the joint embedding model 112 can determine the matching score 310 based on one or more weights applied to the matching score 310. For instance, the joint embedding model 112 can weight training images based on characteristics associated with a particular training image. In some examples, the joint embedding model 112 may weight a number of matches associated with a matching score 310 based on any imaging characteristic (e.g., feature, image feature vector, or other imaging characteristic discussed herein). In some examples, the joint embedding model 112 can adjust a relevance ranking associated with the set of visual-semantic embeddings based on a weighted matching score.

In some examples, the joint embedding model 112 can determine a highest relevance ranking among one or more images based on a number of matching characteristics, a matching score 310, or a weighted matching score of each of the one or more images. In some examples, the highest relevance ranking can be used to sort training images that includes a top 1, 5, 10, 20, or any other suitable number of top training images associated with the set of visual-semantic embeddings.

Figure 7:
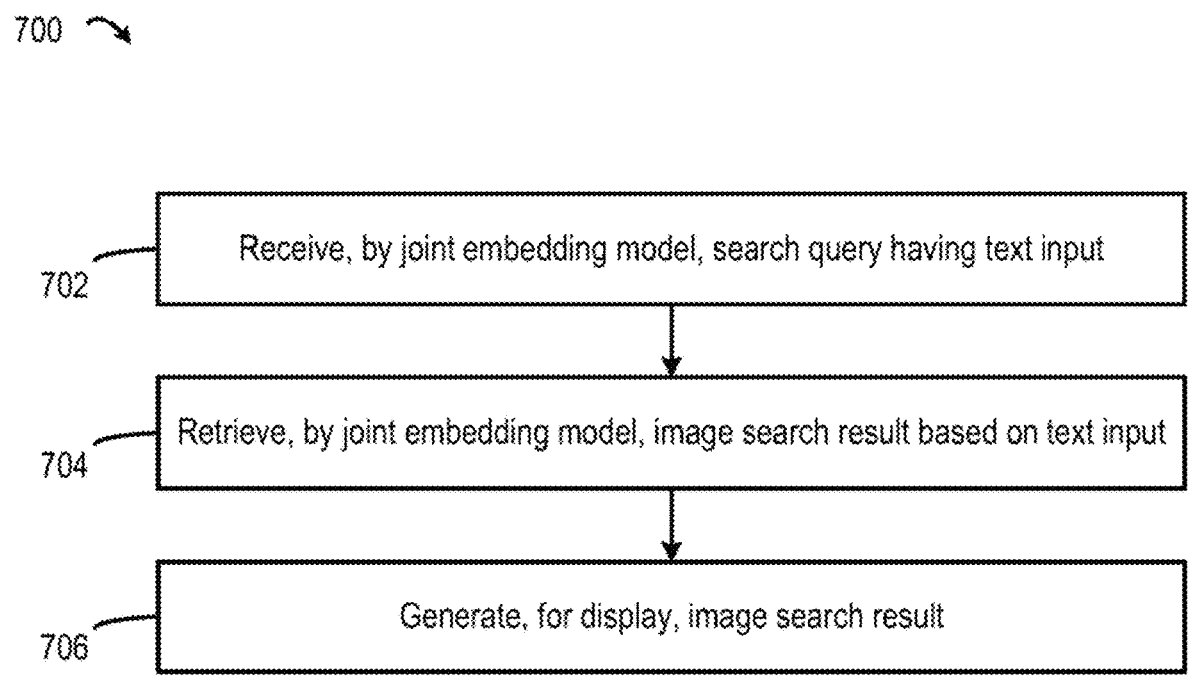
FIG. 7 depicts an example of a process for generating, for display, image results using a joint embedding model trained by joint visual-semantic embedding and grounding via multi-task training, according to certain embodiments of this disclosure.

Example Method for Generating, for Display, Search Results Using a Joint Embedding Model Trained by Joint Visual-Semantic Embedding and Grounding via Multi-Task Training FIG. 7 is an example of a process 700 for image searching using joint visual-semantic embedding and grounding via multi-task training, according to certain embodiments of this disclosure. One or more operations described with respect to FIG. 7 can be used to implement a step for image searching using a joint embedding model (e.g., joint embedding model 112) via multi-task training based on visually grounded visual-semantic embeddings. One or more processing devices (e.g., computing environment 100) implement operations depicted in FIG. 7 by executing suitable program code (e.g., joint embedding model 112). For illustrative purposes, the process 700 is described with reference to certain examples depicted in the figures. Other implementations, however, are possible.

At block 702, the process 700 involves receiving, by the joint embedding model 112, a search query having a text input. As discussed above, the image processing system 108 can receive a text input from a user. The text input can include a search term, search string, or other textual information. In some examples, the text input may be entered via client device 102 over a network (e.g., data network 104). In one example, the joint embedding model 112 obtains textual information from the search query based on the text input. The joint embedding model executes a text encoder 114 to generate a textual feature vector based on the textual information associated with the text input. Further, in some examples, the textual information associated with the text input can include contextual information based on words, symbols, phrases, or sentences derived from the textual information.

In some examples, the search query may include an image. For example, the text input may be accompanied by an image input. In some examples, such an image input may include an example of a relevant object (e.g., virtual object), spatial feature (e.g., scenery, viewing angle), or other visual characteristic (e.g., brightness, color, etc.). For example, a search query having a text input of a "red apple" may be accompanied by an image of a real or virtual apple. In some examples, the image processing system 108 may utilize the joint embedding model 112 to search for the red apple based on one or more characteristics of the image (e.g., a particular hue of red, a location of the red apple within the overall image, a length of a stem of the red apple, an amount of light reflected by a surface of the red apple, etc.). In additional or alternative embodiments, the joint embedding model 112 can obtain visual grounding data from the search query based on the image input. For instance, the joint embedding model can execute an image encoder 116 to generate an image feature vector based on the visual grounding data associated with the image input.

At block 704, the process 700 involves generating, for display, an image result using the joint embedding model 112 by retrieving the image result based on the text input. For example, the joint embedding model 112 can execute a semantics engine 118 to generate matches based on the text input. For instance, the semantics engine 118 can identify images based on one or more matches between textual information associated with the text input and candidate image results. In one example, the semantics engine 118 determines a search term is present in the textual information. The semantics engine 118 then determines whether the search term matches one or more characteristics of a candidate image result. In some examples, a characteristic may include an object depicted in the candidate image result. But in some examples, the characteristic may include metadata associated with the candidate image result. For instance, the metadata associated with the image can include a title of the image, a content tag, a geolocation or geotag, an annotation, a syntax, a standard, a codec, a watermark, etc.

In some examples, the joint embedding model 112 can obtain, from the text encoder 114, one or more textual feature vectors associated with the textual information of the text input. The joint embedding model 112 can utilize these textual feature vectors to determine one or more matching candidate images. Further, a number of matches between the one or more textual feature vectors and feature vectors associated with the one or more matching candidate images may be used to determine a relevance ranking among the one or more matching candidate images. In some examples, the joint embedding model 112 may retrieve the one or more candidate images and sort them before sending the one or more candidate images to the image processing system 108, a rendering engine 122, a client device 102, or a combination of these.

For instance, a text input of a sentence may include textual information associated with each word, one or more phrases, the sentence as a whole, contextual information, or any combination of these. In one example, the joint embedding model 112 determines a number of matches between the words, phrases, sentence, and contextual information associated with the textual information of the text input and textual feature vectors associated with a set of candidate image results. In some examples, the set of candidate image results may include images used while training the joint embedding model 112. However, in additional or alternative embodiments, the set of candidate images may be retrieved from a remote location (e.g., multimedia database 106).

In this example, the joint embedding model 112 determines the number of matches between the textual information and the textual feature vectors associated with the set of candidate images. Further, the joint embedding model 112 determines relevance rankings among a subset of matching candidate images from the set of candidate images. The joint embedding model 112 determines candidate images having the highest relevance rankings from among the subset of matching candidate images (e.g., a top one, two, five, ten, twenty, or any number of the subset of matching candidate images). The joint embedding model 112 then sends a predetermined number of the subset of matching candidate images to the rendering engine 122. In some examples, the predetermined number of the subset of matching candidate images may be based on a user preference, profile, or a default setting. And in some examples, the joint embedding model 112 can send the predetermined number of the subset of matching candidate images to the rendering engine 122 with a particular order or arrangement based on a comparison or sorting of the highest relevance rankings.

In some examples, the search query may include an image input. For example, the search query may include both a text input and an accompanying an image input. In some examples, such an image input may include an example of a relevant object (e.g., a real or virtual object), spatial feature (e.g., scenery, viewing angle), or other visual characteristic (e.g., brightness, color, etc.). For example, a search query having a text input of a "red apple" may be accompanied by an image input of a real or virtual apple. In some examples, the image processing system 108 may utilize the joint embedding model 112 to search for the red apple based on one or more characteristics of the image (e.g., a particular hue of red, a location of the red apple within the overall image, a length of a stem of the red apple, an amount of light reflected by a surface of the red apple, etc.). In addition, the joint embedding model 112 can obtain visual grounding data associated with the search query based on the image input.

For instance, the joint embedding model 112 can execute an image encoder 116 to generate an image feature vector associated with the image input. In some examples, the joint embedding model 112 can use this image feature vector as additional visual grounding data associated with the image input. The joint embedding model 112 can determine and use image feature vectors associated with the input image to determine matches between the input image and candidate images using their respective image feature vectors. Further, a number of matches between the image feature vectors of the image input and image feature vectors associated with the matching candidate images may be used to determine a relevance ranking among matching candidate images. In some examples, the joint embedding model 112 may retrieve the candidate images and sort them before sending candidate images to the image processing system 108, the rendering engine 122, or the client device 102.

In one example, the joint embedding model 112 determines a number of matches between an image feature vector associated with the image input and image feature vectors associated with a set of candidate image results. In some examples, the set of candidate image results may include images used while training the joint embedding model 112. However, in additional or alternative embodiments, the set of candidate images may be retrieved from a remote location (e.g., multimedia database 106). In some examples, the joint embedding model 112 determines a number of matches between the image feature vector associated with the image input and image feature vectors associated with a set of candidate image results. In some examples, the joint embedding model 112 can determine relevance rankings among a subset of matching candidate images. For instance, the joint embedding model 112 can determine candidate images having a highest relevance ranking from among the subset of matching candidate images (e.g., a top one, two, five, ten, twenty, etc.). Using the example of the red apple above, the joint embedding model 112 can determine a number of the subset of matching candidate images to send to the rendering engine 122 based on a characteristic associated with red apple image input (e.g., a region, a hue of red, a pixel value, an overall size, a pixel intensity, an amount of brightness, etc.).

In some examples, a textual feature vector and an image feature vector associated with a search query for a text input and an image input can be used in combination. Further, in some examples, such a combination may have be based on weighted values associated with the text input, the image input, a textual feature vector, an image feature vector, or a combination of these. In some examples, the predetermined number of the subset of matching candidate images may be based on a user preference, profile, or a default setting. And in some examples, the joint embedding model 112 can send the predetermined number of the subset of matching candidate images to the rendering engine 122 with a particular order or arrangement based on a comparison or sorting of the highest relevance rankings.

In some examples, the joint embedding model 112 may determine that no matching image-text pair exists between the image and the textual information. In this example, the image processing system 108 accesses multimedia database 106 to retrieve a set of images. The joint embedding model 112 can execute the semantics engine 118 to generate a set of visual-semantic embeddings for each image within the set of images. By using relevant image-text pairs associated with each image, the joint embedding model 112 can identify one or more images from among the set of images based on a number of matching characteristics between each of the one or more images and the textual information.

In one example, the computing environment 100 includes the rendering engine 122 that executes program code for generating search results for display. For instance, the rendering engine 122 can use a combination of information obtained from the semantics engine 118 and the grounding engine 120 to display image results. The rendering engine 122 can generate an arrangement of images depicting visually grounded image results. In some examples, the rendering engine 122 outputs the generated image results as an ordered list based on relevance rankings. In some examples, the rendering engine 122 transmits display signals to one or more computing devices. Images provided by the joint embedding model 112 are output as a search result having image results by the one or more computing devices. In one example, outputting the search result may include displaying the search result on a user interface associated with computing environment 100 (e.g., a user interface displayed on client device 102). In other examples, outputting the search result may be limited to electronic storage of a search result on a memory associated with computing environment 100.

Example of a Computing System for Providing a Joint Embedding Model

Figure 8:
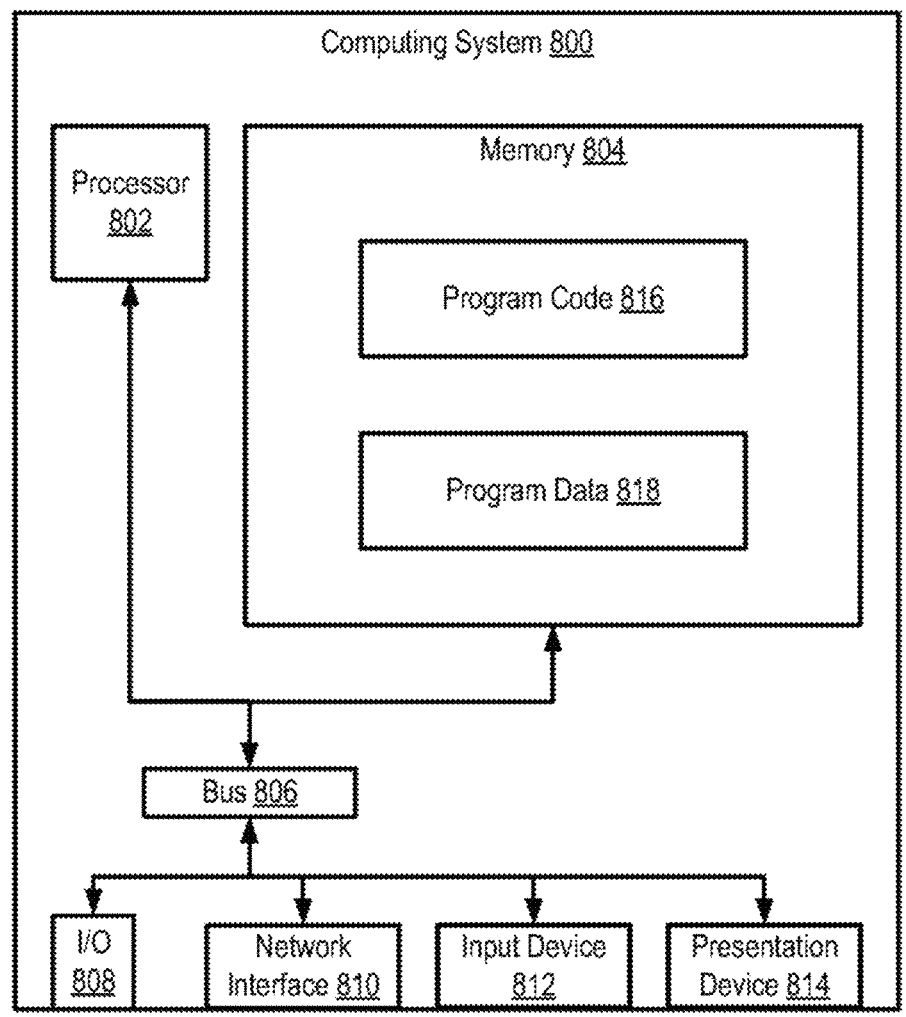
FIG. 8 an example of a computing system that can perform certain operations described herein, according to certain embodiments of this this disclosure.

Any suitable computing system can be used for performing the operations described herein. FIG. 8 depicts an example computing system 800 that can perform certain operations described herein, according to certain aspects of this disclosure. In some embodiments, the computing system 800 executes image processing system 108 of FIG. 1. In other embodiments, separate computing systems having devices similar to those depicted in FIG. 8 (e.g., a processor, a memory, etc.) separate execute image processing system 108.

The depicted example of a computing system 800 includes a processor 802 communicatively coupled to one or more memory devices 804. The processor 802 executes computer-executable program code 816 stored in a memory device 804, accesses information (e.g., program data 818) stored in the memory device 804, or both. Examples of the processor 802 include a microprocessor, an application-specific integrated circuit ("ASIC"), a field-programmable gate array ("FPGA"), or any other suitable processing device. The processor 802 can include any number of processing devices, including a single processing device.

The memory device 804 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 800 may also include a number of external or internal devices, such as input or output devices. For example, the computing system 800 is shown with one or more input/output ("I/O") interfaces 808. An I/O interface 808 can receive input from input devices (e.g., input device 812) or provide output to output devices. One or more buses 806 are also included in the computing system 800. The bus 806 communicatively couples one or more components of a respective one of the computing system 800.

The computing system 800 executes program code 816 that configures the processor 802 to perform one or more operations described herein. For example, the program code 816 may include the joint embedding model 112 (including the text encoder 114, the image encoder 116, the semantics engine 118, and the grounding engine 120), the search engine 110, the rendering engine 122, or other suitable applications to perform operations described herein. The program code 816 may be resident in the memory device 804 or any suitable computer-readable medium and may be executed by the processor 802 or another suitable processor. In additional or alternative embodiments, the program code 816 described above is stored in one or more other memory devices accessible via data network 104.

The computing system 800 also includes a network interface device 810. The network interface device 810 includes any device or group of devices suitable for establishing a wired or wireless data connection to one or more data networks. Non-limiting examples of the network interface device 810 include an Ethernet network adapter, a modem, and/or the like. The computing system 800 is able to communicate with one or more other computing devices via data network 104 using the network interface device 810.

In some embodiments, the computing system 800 also includes presentation device 814. A presentation device 814 can include any device or group of devices for providing visual, auditory, or other suitable sensory output. Non-limiting examples of the presentation device 814 include a touchscreen, a monitor, a speaker, a separate mobile computing device, etc. In some aspects, the presentation device 814 can include a remote client-computing device such as client device 102 that communicates with computing system 800 using one or more data networks described herein. Other aspects can omit presentation device 814.

General Considerations

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, this disclosure has been presented for purposes of example rather than limitation, and does not preclude the inclusion of such modifications, variations, and/or additions to the present subject matter as would be readily apparent to one of ordinary skill in the art.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, script, or other type of language or combinations of languages may be used to implement the teachings herein in software to be used in programming or configuring a computing device. The order of the blocks presented in the examples above can be varied—e.g., blocks can be re-ordered, combined, and/or broken into sub-blocks. Certain blocks or processes can be performed in parallel.

The invention claimed is:

1. A method in which one or more processing devices perform operations comprising:
   receiving, by a joint embedding model trained to generate an image result, a search query comprising a text input, wherein the joint embedding model is trained by:
   accessing training data comprising a set of images and a set of textual information;
   encoding the set of images into image feature vectors based on spatial features associated with each image;
   encoding the set of textual information into textual feature vectors based on semantic information associated with each textual information;
   determining matches between the image feature vectors associated with the set of images and the textual feature vectors associated with the set of textual information, wherein determining the matches comprises at least determining objects in the image that are associated with the textual information;
   generating a set of image-text pairs for the set of images based on the matches;
   generating a visual grounding dataset for the set of images based on spatial information associated with each textual information and the spatial features associated with each image; and
   generating activation maps comprising, for each image of the set of images, an activation map comprising textual feature vectors associated with regions in the image that are indicated by the visual grounding dataset;
   generating, based on the activation maps, a set of visual-semantic joint embeddings for the set of images by grounding the set of image-text pairs using the visual grounding dataset; and
   generating, for display, an image result using the joint embedding model by retrieving the image result based on the text input.

2. The method of claim 1, wherein the joint embedding model comprises a machine learning model and is configured to access shared data via a shared network, the one or more processing devices comprises a convolutional neural network, and the joint embedding model is further trained by: generating a joint embedding space by projecting 1×1 convolutional layers associated with the image feature vectors onto 7×7 feature maps associated with the textual feature vectors; and generating the set of visual-semantic joint embeddings for the set of images substantially simultaneously in the joint embedding space.

3. The method of claim 2, wherein generating the activation maps comprises performing an average pooling for the 1×1 convolutional layers projected onto the 7×7 feature maps.

4. The method of claim 1, wherein grounding the set of image-text pairs using the visual grounding dataset comprises: determining, for the set of images, a grounding loss associated with one or more regions of each respective image, the grounding loss based at least in part on the spatial information.

5. The method of claim 4, wherein grounding the set of image-text pairs using the visual grounding dataset further comprises: determining, for the set of images, relevance rankings based at least in part on a number of matches associated with each image; and generating the set of visual-semantic joint embeddings for the set of images based at least in part on the relevance rankings and the grounding loss.

6. The method of claim 1, wherein the search query further comprises an image input, and the operations further comprise: retrieving, by the joint embedding model, the image result based at least in part on one or more features associated with the image input.

7. The method of claim 1, wherein the image result is a first image result, and the operations further comprise: retrieving a second image result based on the text input; and generating, for display, the first image result and the second image result.

8. The method of claim 7, wherein the operations further comprise: determining relevance rankings for each of the first image result and the second image result; determining a highest relevance ranking from among the relevance rankings; and generating, for display, the first image result and the second image result in an arrangement that is based at least in part on the highest relevance ranking.

9. A system comprising:
   one or more processing devices; and
   a non-transitory computer-readable medium communicatively coupled to the one or more processing devices and storing instructions, wherein the one or more processing devices are configured to execute the instructions and thereby perform operations comprising:
   receiving, by a joint embedding model trained to generate an image result, a search query comprising a text input, wherein the joint embedding model is trained by:
   accessing training data comprising a set of images and a set of textual information;
   encoding the set of images into image feature vectors based on spatial features associated with each image;
   encoding the textual information into textual feature vectors based on semantic information associated with each textual information;
   determining matches between the image feature vectors associated with the set of images and the textual feature vectors associated with the set of textual information, wherein determining the matches comprises at least determining objects in the image that are associated with the textual information;
   generating a set of image-text pairs for the set of images based on the matches;

generating a visual grounding dataset for the set of images based on spatial information associated with each textual information and the spatial features associated with each image; and generating activation maps comprising, for each image of the set of images, an activation map comprising textual feature vectors associated with regions in the image that are indicated by the visual grounding dataset;

generating, based on the activation maps, a set of visual-semantic joint embeddings for the set of images by grounding the set of image-text pairs using the visual grounding dataset; and generating, for display, an image result using the joint embedding model by retrieving the image result based on the text input.

10. The system of claim 9, wherein the joint embedding model comprises a machine learning model and is configured to access shared data via a shared network, the one or more processing devices comprises a convolutional neural network, and the joint embedding model is further trained by: generating a joint embedding space by projecting 1×1 convolutional layers associated with the image feature vectors onto 7×7 feature maps associated with the textual feature vectors; and generating the set of visual-semantic joint embeddings for the set of images substantially simultaneously in the joint embedding space.

11. The system of claim 10, wherein generating the activation maps comprises performing an average pooling for the 1×1 convolutional layers projected onto the 7×7 feature maps.

12. The system of claim 9, wherein grounding the set of image-text pairs using the visual grounding dataset comprises: determining, for the set of images, a grounding loss associated with one or more regions of each respective image, the grounding loss based at least in part on the spatial information.

13. The system of claim 12, wherein grounding the set of image-text pairs using the visual grounding data set further comprises: determining, for the set of images, relevance rankings based at least in part on a number of matches associated with each image; and generating the set of visual-semantic joint embeddings for the set of images based at least in part on the relevance rankings and the grounding loss.

14. The system of claim 9, wherein the search query further comprises an image input, and the operations further comprise: retrieving, by the joint embedding model, the image result based at least in part on one or more features associated with the image input.

15. The system of claim 9, wherein the image result is a first image result, and the operations further comprise: retrieving a second image result based on the text input; and generating, for display, the first image result and the second image result.

16. The system of claim 15, wherein the operations further comprise: determining relevance rankings for each of the first image result and the second image result; determining a highest relevance ranking from among the relevance rankings; and generating, for display, the first image result and the second image result in an arrangement that is based at least in part on the highest relevance ranking.

17. A method of training a joint embedding model in which one or more processing devices perform operations comprising:

accessing training data comprising a set of images and a set of textual information;

encoding the set of images into image feature vectors based on spatial features associated with each image;

encoding the textual information into textual feature vectors based on semantic information associated with each textual information;

determining matches between the image feature vectors associated with the set of images and the textual feature vectors associated with the set of textual information, wherein determining the matches comprises at least determining objects in the image that are associated with the textual information;

generating a set of image-text pairs for the set of images based on the matches;

generating a visual grounding dataset for the set of images based on spatial information associated with the textual information and the spatial features associated with each image; and generating activation maps comprising, for each image of the set of images, a n activation map comprising textual feature vectors associated with regions in the image that are indicated by the visual grounding dataset;

generating, based on the activation maps, a set of visual-semantic joint embeddings for the set of images by grounding the set of image-text pairs using the visual grounding dataset.

18. The method of claim 17, wherein the joint embedding model comprises a machine learning model and is configured to access shared data via a shared network, the one or more processing devices comprises a convolutional neural network, and the operations further comprise: generating a joint embedding space by projecting 1×1 convolutional layers associated with the image feature vectors onto 7×7 feature maps associated with the textual feature vectors; and generating the set of visual-semantic joint embeddings for the set of images substantially simultaneously in the joint embedding space.

19. The method of claim 18, wherein generating the activation maps comprises performing an average pooling for the 1×1 convolutional layers projected onto the 7×7 feature maps.

20. The method of claim 17, wherein grounding the set of image-text pairs using the visual grounding dataset comprises: determining, for the set of images, a grounding loss associated with one or more regions of each respective image, the grounding loss based at least in part on the spatial information; determining, for the set of images, relevance rankings based at least in part on a number of matches associated with each image; and generating the set of visual-semantic joint embeddings for the set of images based at least in part on the relevance rankings and the grounding loss.

* * * * *